350-452 SR
XR 3,020,395
CROSS REFERENCE
SEARCH ROO

X2032

INVENTOR.
GORDON M. PELTZ
BY
Morgan, Finnegan, Durham & Pine
ATTORNEYS.

3020395
OR IN 362/330

INVENTOR.
GORDON M. PELTZ
BY
Morgan, Finnegan, Durham & Pine
ATTORNEYS.

Feb. 6, 1962 G. M. PELTZ 3,020,395

LIGHTING DEVICE

Filed May 27, 1957 6 Sheets-Sheet 3

$i''$ = 55°, ANGLE OF INCIDENCE FOR FLAT SURFACE.
$i$ = 30°, " " " " POINT ON SINE CURVE.
$i'$ = 80°, " " " " POINT ON SINE CURVE.
$d$ & $d'$ = 25°, MAXIMUM DEPARTURE OF SINE CURVE FROM FLAT SURFACE.

INVENTOR.
GORDON M. PELTZ
BY
Morgan, Finnegan, Durham & Pine
ATTORNEYS.

INVENTOR.
GORDON M. PELTZ
BY
Morgan, Finnegan, Durham & Pine
ATTORNEYS.

INVENTOR.
GORDON M. PELTZ
BY
Morgan, Finnegan, Durham & Pine
ATTORNEYS

Feb. 6, 1962 G. M. PELTZ 3,020,395

LIGHTING DEVICE

Filed May 27, 1957 6 Sheets-Sheet 6

INVENTOR.
GORDON M. PELTZ
BY
Morgan, Finnegan, Durham & Pine
ATTORNEYS.

United States Patent Office 3,020,395

Patented Feb. 6, 1962

3,020,395
LIGHTING DEVICE

Gordon M. Peltz, Montclair, N.J., assignor to The Phoenix Glass Co., Monaca, Pa., a corporation of West Virginia Filed May 27, 1957, Ser. No. 661,638
3 Claims. (Cl. 240—106)

This invention relates to lighting devices or luminaires for interior and exterior illumination, and especially to light diffusion means for light transmitting plates in such devices. The invention is more especially useful with light directing lenses of the prismatic type known as prismatic lenses or Fresnel lenses.

Prismatic lens are commonly used to spread light in a specified pattern over an area. Prisms are usually arranged in any convenient manner, frequently in concentric circles on the side of the plate away from the light source to direct the light into the desired pattern. The persons in the illuminated area are influenced by the amount, quality and pattern of the illumination.

It is important that the lens provide maximum light transmission while avoiding excessive or irritating glare. From the point of view of appearance and aesthetic reactions, it is also desirable to prevent the outlines of the light source in the luminaire from being discernible to the viewer. It is particularly important that the prismatic lens have substantially uniform brightness without concentrated points of high brightness (hot spots).

In an attempt to meet some of these requirements it has become common practice to interrupt the surface of the prismatic lens on the side toward the light source in order to scatter or diffuse the light. These nonplanar elements or interruptions, usually in a geometric pattern for sake of appearance, are generally in such forms as flutes, ribs, channels, elliptical projections or dimples.

The use of such diffusion means generally resulted in an increase in the amount of incident light reflected from the surface of the prismatic lens with consequent reduction in the amount of light transmitted through the lens and reduced illumination. However, in present practices the need for adequate diffusion was considered of importance sufficient to justify substantial reduction in the percentage of light transmitted through the lens.

Also, in the present practice, use of diffusing means caused loss of uniformity in the brightness. This lack of uniformity could itself produce irritating glare in the eyes of the viewer. In addition, the diffusion means interferred with the pattern transmitted by the prisms.

I have discovered that in light transmitting plates with diffusion means, including prismatic lenses, the light transmitting efficiency, the quality of the pattern transmitted, the gross glare effect, the uniformity of the brightness, the occurrence of local hot spots of high brightness, and the general aesthetic effects are all related to and can be controlled by the size and character of the angle of departure from the mean incident surface, of the surface interruptions, i.e. diffusion elements or sections. The expression "angle of departure" herein is defined as the angle subtended by a tangent from a point on the surface interruption to the mean incident surface or theoretical flat surface of the lens of the luminaire.

Speaking generally, on the basis of this discovery, the invention provides a light transmitting device with a plate having improved diffusion means which produces the desired diffusion without substantial reduction in light transmission and with minimum interference to the light pattern. In addition, the invention includes a light transmitting plate of the prismatic lens type having improved diffusion means for providing substantially uniform brightness. Further, the invention provides an improved diffusion means for a light transmitting plate without production of light and dark areas or hot spots and presents a soothing and pleasing sensation to the viewer.

Other advantages of the invention will be obvious or may be learned by practice with the invention, the same being realized and attained by means of the combinations, improvements and instrumentalities pointed out in the appended claims.

The invention consists of the novel parts, constructions, arrangements, combinations and improvements herein shown and described.

Briefly, the above results are accomplished in a luminaire having a light source (such as the filament of a lamp) positioned a predetermined distance above the light transmitting plate. A plurality of surface interruptions (such as flutes), hereinafter referred to as "diffusion sections," cover substantially all of the incident side of the light transmitting plate. Each of the light diffusion sections has a non-planar cross section having a predetermined and controlled maximum angle of departure from the mean incident surface of the light transmitting plate. The predetermined maximum angle is such that when vectorially added to the maximum incident angle described by the incident light rays to the mean incident surface, the total incident angle does not exceed the angle of incidence generally recognized as critical with respect to percentage of light transmitted versus light reflected from glass surfaces in the art of light phenomena. This produces maximum diffusion consistent with transmission of substantially all of the incident light through the light transmitting plate.

Preferably the predetermined maximum angle of departure of each diffusion section is also such that a maximum angle of deviation is provided for each of substantially all of the lines of sight from a normal viewing position beneath the light transmitting plate so that substantially none of the lines of sight fails to intersect the light source. This produces substantially uniform brightness over the entire surface of the plate and minimum glare. In addition, there are no contrasting light and dark areas to distract the viewer.

More preferably, the diffusion sections are in the form of radial interruptions with a maximum angle of departure from the mean incident surface in the range of 5 to about 12 degrees. Still more preferably, the maximum angle of departure does not exceed 8.5 degrees. Still more preferably the radial interruptions are flutes having a sinusoidal cross-section.

Other objects, features and advantages will be apparent from the following detailed description of the theory and structure of the invention, which is accompanied by drawings wherein:

FIGURE 6 is a chart showing the relationship between the angle of incidence of a light ray and the percentage of light reflection from the incident side of a flat glass plate;

Figure 7:
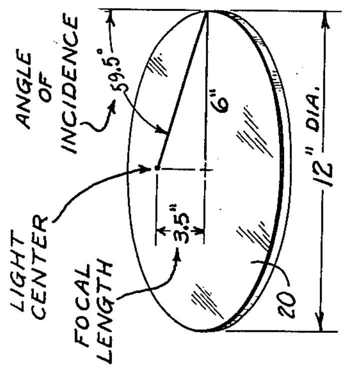
Figure 8:
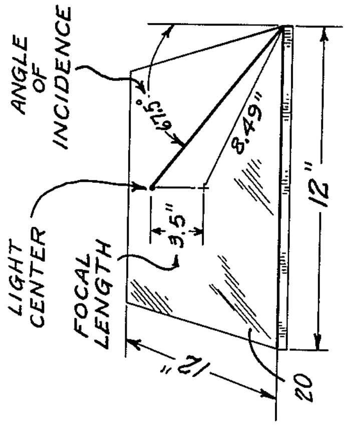
Figure 9:
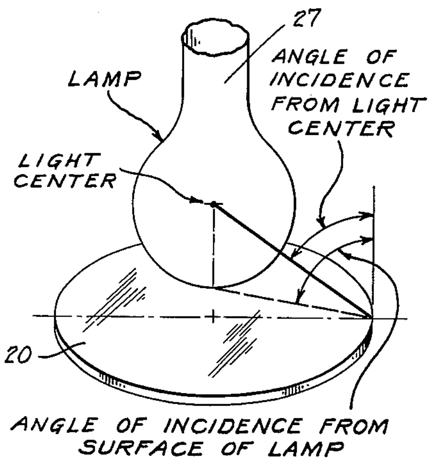

FIGURES 7 and 8 schematically illustrate the angle of incidence of a ray transmitted from the assumed center of a light source to the periphery of a circular glass plate and to the corner of a square glass plate respectively;

FIGURE 9 schematically shows how the incident angle is increased for light rays transmitted from the bottom of a lamp as contrasted to those coming from the assumed light center.

Figure 10:
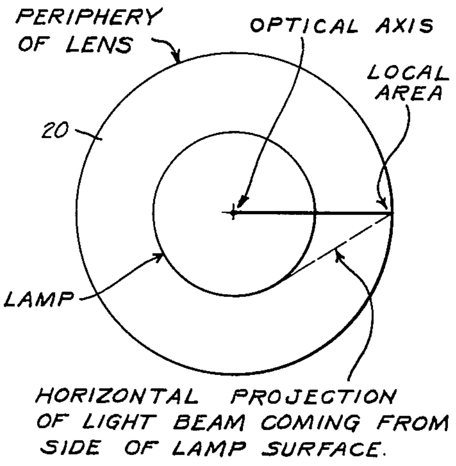
Figure 10A:
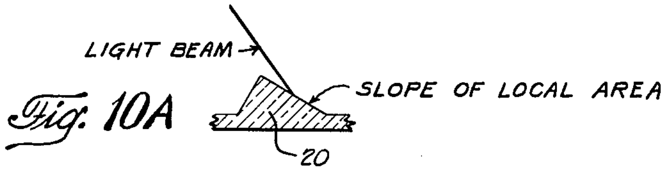
Figure 11:
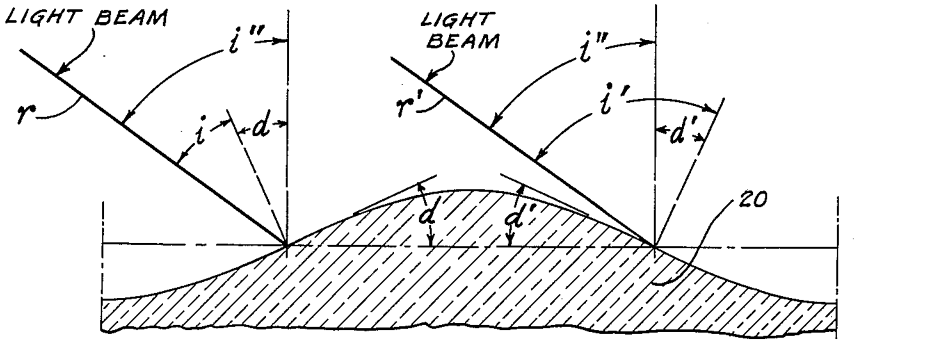
Figure 12:
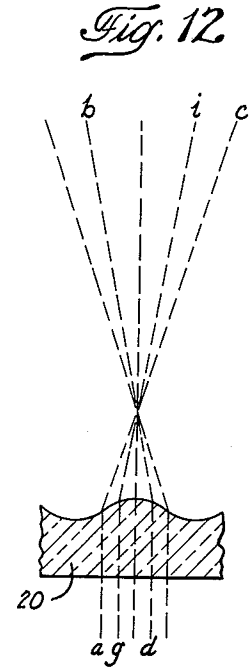
Figure 12A:
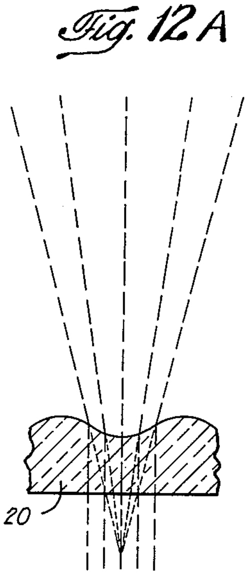
Figure 13:
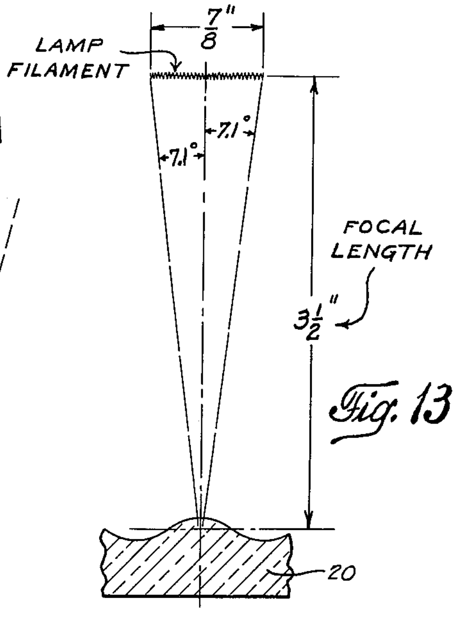

FIGURES 10 and 10*a* schematically illustrate how the incident angle is increased for light rays transmitted from the side of a lamp to an irregularity in the surface of a lens plate where the irregularity slopes away from the light ray;

FIGURE 11 is an enlarged schematic section view showing how any irregularity in the incident surface of a light transmitting plate alters the angle of incidence;

FIGURES 12 to 15 illustrate how the maximum angle of slope or departure is determined with respect to the angles of deviation of typical lines of sight from a normal viewing position beneath a light transmitting plate having arcuate profile flutes;

FIGURES 12 and 12*a* show cross sections of the light transmitting plate and the deviation pattern of typical lines of sight after passing through a flute;

FIGURE 13 illustrates the angle subtended by a lamp filament located directly over the center of the flute, at a distance (focal length) from the mean incident surface of the light transmitting plate which is common in commercial practice.

Figures 2, 3:
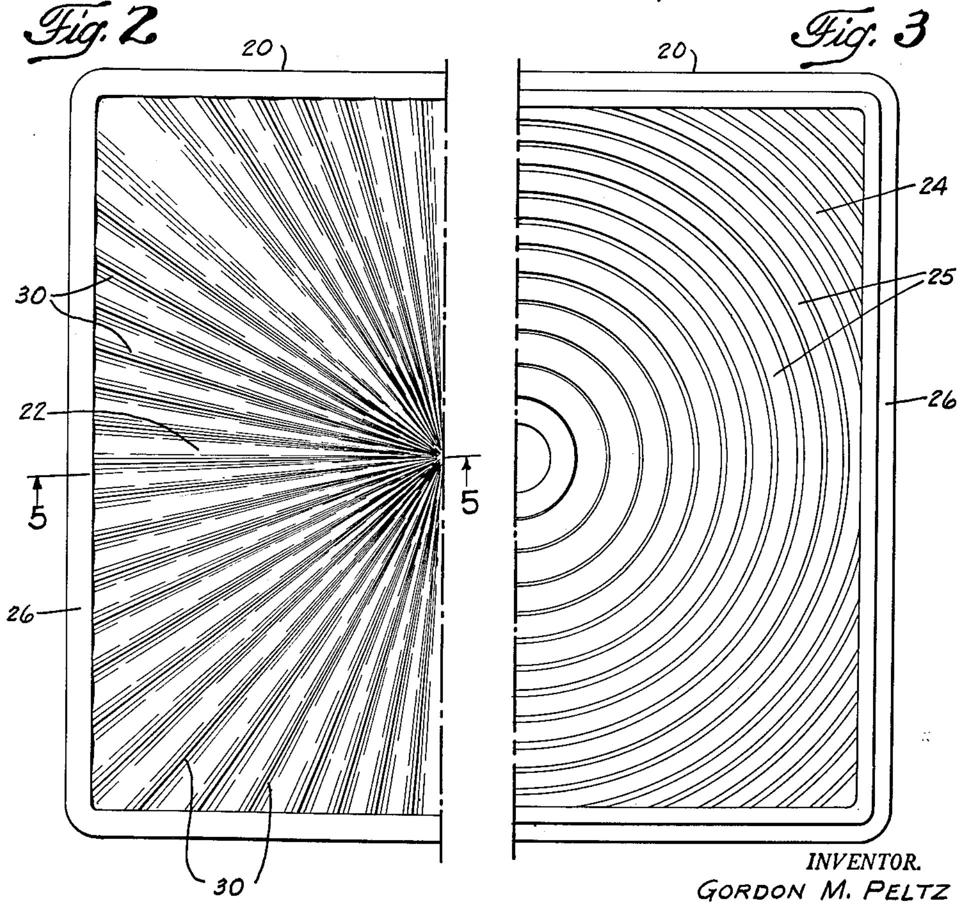
FIGURE 2 is a top plan view of a prismatic lens of the invention showing the radial flutes which comprise the diffusion sections on the incident surface, in accordance with a preferred embodiment of the invention.
FIGURE 3 is a bottom plan view of the prismatic lens showing the concentric annular prisms.
Figure 4:
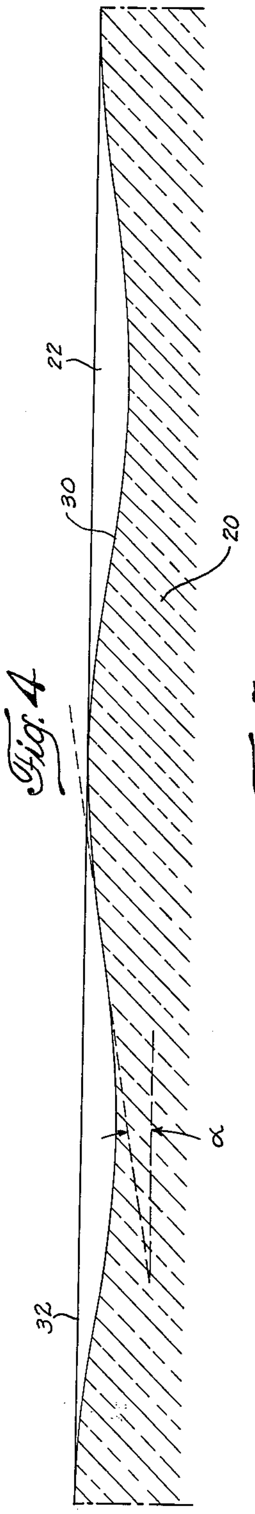
FIGURE 4 is a sectional view taken along the lines 4—4 of FIGURE 1, enlarged 10 times, illustrating the sinusoidal cross section of the radial flutes of the prismatic lens with a maximum slope of 8.5 degrees in accordance with the most preferred embodiment of the invention.
Figure 14:
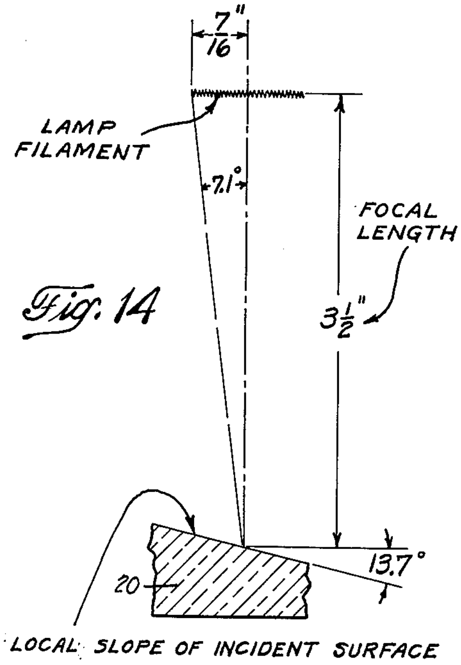
Figure 15:
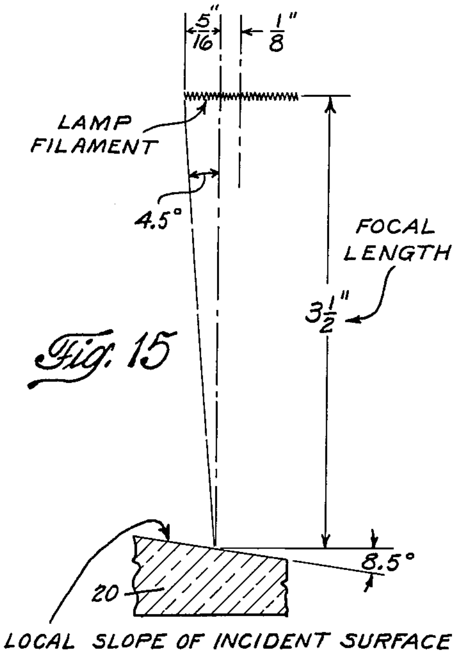
Figure 16:
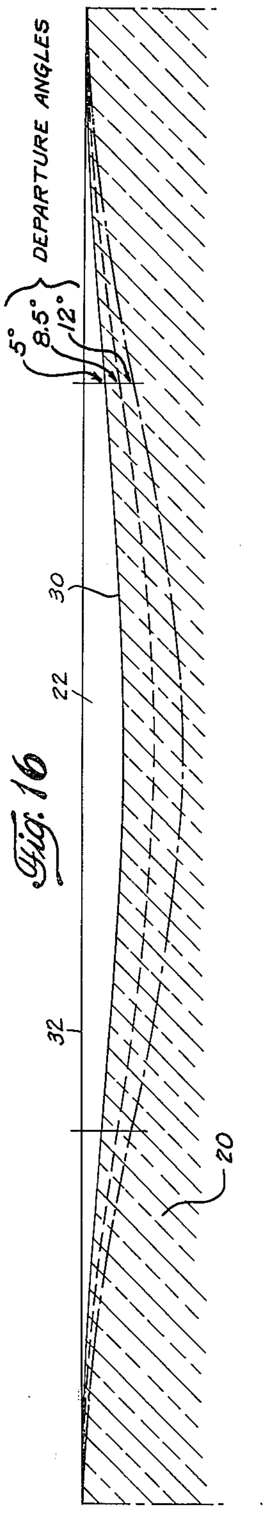
Figure 18:
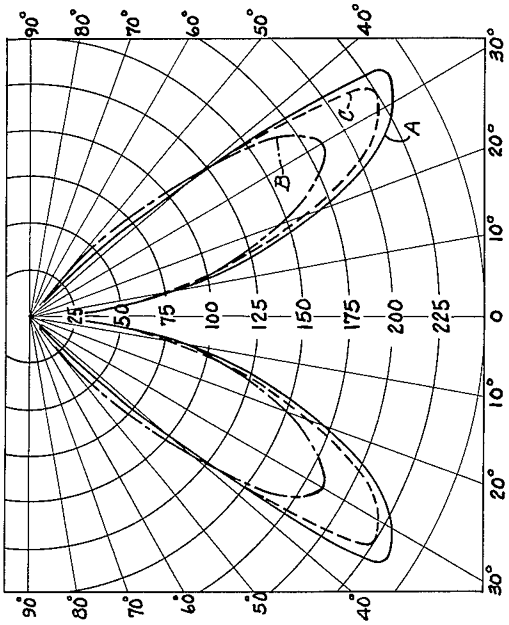
Figure 17:
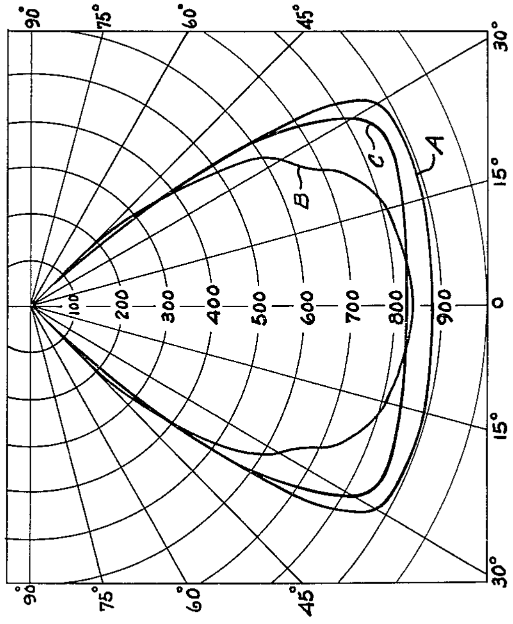
Figure 19:
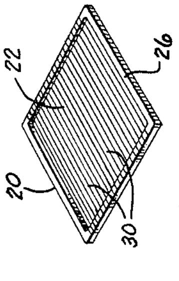
Figure 20:
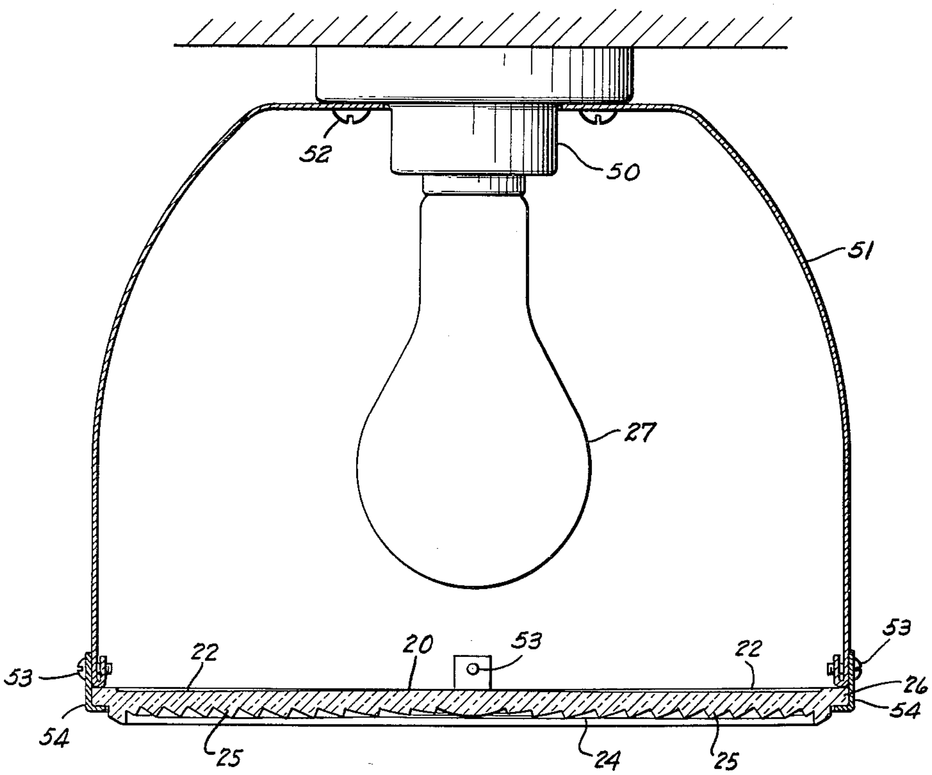

FIGURE 14 shows how the maximum angle of departure from the mean incident surface is determined in the instance where the lamp filament is positioned directly over the center of the flute with a typical focal length of 3½ inches;

FIGURE 15 illustrates how the maximum angle of departure is determined in the case of the usual luminaire arrangement in which the lamp filament is at least one-eighth of an inch off the flute center;

FIGURE 16 shows cross section views, enlarged 20 times, of flutes having maximum departure angles of 5, 8.5 and 12 degrees respectively, in accordance with other embodiments of the invention;

FIGURE 17 shows photometric curves of apparent candle power distribution of prismatic lens without any irregularity in the incident surface (curve A), and with surface irregularities of the type shown on the prismatic lens of FIGURE 2 with a maximum departure angle of 8.5 degrees (curve C) and of 24 degrees (curve B);

FIGURE 18 shows the light distribution or quantity of light flux expressed in lumens for the curves of FIGURE 17; and FIGURE 19 is a top plan view of a section of a light transmitting plate in accordance with still another embodiment of the invention employing parallel flutes;

FIGURE 20 is a side view, partly in section, of a luminaire showing the lamp, light transmitting plate and means for holding the lamp.

Referring now to the preferred embodiments of the invention shown by way of example in the drawings, the diffusion system will first be discussed in detail with respect to the structural characteristics of the invention shown in FIGURES 1 to 5. Thereafter, the discoveries underlying the invention will be discussed in detail.

Figure 1:
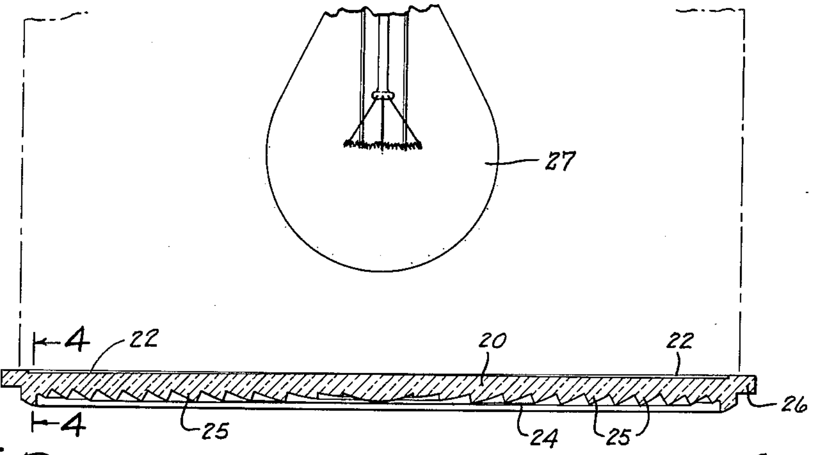
FIGURE 1 is a vertical sectional view through the optical structure of a luminaire showing the lamp and a light transmitting plate of the prismatic lens type.

FIGURES 1, 2 and 3 show a prismatic lens, i.e. Fresnel lens, having a glass plate 20 with a diffusion system 22 at the top or incident surface and a prismatic lens system 24 consisting of a plurality of concentric annular prisms 25 on the lower or exit surface. A flange 26 borders the periphery of the prismatic lens. A lamp 27 (FIG. 1) is positioned within the periphery above the prismatic lens and at the focal length producing the light distribution pattern desired. In the preferred embodiment illustrated, the lamp 27 is above the center of the lens.

The diffusion system 22 comprises a plurality of light diffusion elements or sections 30 which cover substantially the entire incident surface of the glass plate 20. Each light diffusion section 30 (FIG. 4) consists of a flute having a cross section or profile preferably in the form of a sine wave so that the surfaces of a plurality of adjacent diffusion sections form a continuous sinusoidal curve.

The flutes are radial from the optical center of the incident surface of the glass plate 20 and cover substantially the entire surface. In such an arrangement there are no interruptions in the surface whatsoever along the radius; and, since the flutes are sinusoidal there is no flat portion, no sharp corners and no projections of small radius.

It should be noted that the radial flutes on the incident surface of the glass plate 20 cross the concentric annular prisms 25 of the exit surface at right angles, i.e. a perpendicular relationship exists between the flutes 30 and the tangents to the annular prisms 25 at the point of intersection. The incident light rays from the light source are refracted at right angles to the direction of refraction of the prisms so as to minimize distortion of the pattern of light distribution determined by the type and arrangement of the prisms.

Figure 5:
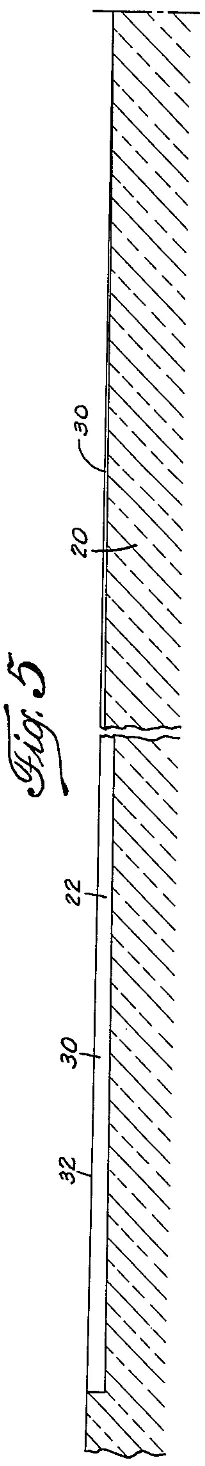
FIGURE 5 is a sectional view, partly broken away, taken along the lines 5—5 of FIGURE 2, enlarged 5 times, showing the increasing amplitude with increasing radius from the optical center of the sinusoidal waves in the incident surface of the prismatic lens which form the flutes.

The flutes are constructed by cutting the desired sinusoidal depressions or shape in the mold from which the flat glass transmitting plate is pressed, in accordance with well known techniques. Each of the flutes starts as near to the optical center of the glass plate 20 as possible at zero depth (FIG. 5). The amplitude of the sine curve increases at a constant rate along the radius so that a maximum angle of departure of 8½ degrees from the mean incident surface 32 (FIG. 4) of the glass plate 20 is obtained uniformly throughout.

The required taper of the amplitude is determined in the following way:

The maximum slope or angular departure from the horizontal ($\alpha$, FIG. 4) will be at the point where the curvature changes from concave to convex. This occurs midway between crest and trough both vertically and horizontally. If the pitch or distance between crest and crest is represented by P and the amplitude or depth of the depression is represented by A, the magnitude of $\alpha$ is represented by $$\tan \alpha = \frac{A\pi}{P}$$

Therefore, $$\frac{A}{P} = \frac{\tan \alpha}{\pi}$$

If $\alpha$ is to be 8.5 then $$\frac{A}{P} = \frac{.1495}{\pi} = .04758$$

If there are to be 60 flutes equally spaced in the full circumference then the pitch P at any radius R will be $2\pi R/60$ or .1047″ at a radius of 1″. At this same point, the amplitude A must be $.1047 \times .04758 = .00498$ or practically .005″.

The pitch P increases uniformly with increasing radius according to the above equation starting at $P=0$ for $R=0$.

If the amplitude A is increased uniformly with the radius at a rate of .005 per inch of radius, starting at $A=0$ for $R=0$, then the ratio $$\frac{A}{P}$$

will remain constant and $\alpha$ will remain constant at 8.5°.

The most useful results have been obtained with the maximum departure angle of 8.5 degrees. However, useful results have been obtained with maximum angles as low as 5 degrees and as high as 12 degrees. FIGURE 16 shows a cross section of a series of adjacent flutes having maximum angles of 5 degrees, 8.5 and 12 degrees. The required taper of each depression to arrive at these maximum angles is accomplished by the formulas set forth above, as will be understood.

The significance of radial interruptions on the incident surface of a light transmitting plate having a maximum angle from the mean incident surface which does not exceed a predetermined angle will be discussed in connection with FIGURES 6 to 11.

Figure 6:
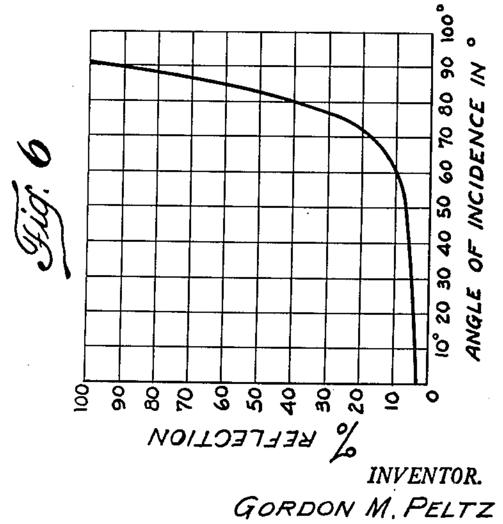
FIGURES 6 to 11 illustrate how the maximum departure angle is determined in order to provide the maximum amount of diffusion consistent with substantially no light loss from reflection from the incident surface of a light transmitting plate.

It is well known that the percentages of light reflected from an incident glass surface, as contrasted to light transmitted, varies not in a straight line function but approximately according to the curve shown on FIGURE 6. The curve illustrates that reflection losses are less than ten percent within an incident angle of about 60 degrees but increase very rapidly with greater incident angles. The greater the percentage of reflection, the lower the percentage of light transmission through the light transmitting plate. Although there is no sharp break in the curve at any precise point, with angles of incidence above about 60 degrees the percentage of light reflection rises very rapidly, and hereafter I shall refer to this as the critical angle of incidence.

FIGURE 7 shows how the angle of incidence varies with a typical commercial circular plate having a 12 inch diameter with no incident surface irregularities, assuming a typical focal length (distance between the light center and the incident surface) of 3.5 inches. FIGURE 20 illustrates a typical embodiment of the invention in a luminaire wherein the bulb 27 is supported in a socket fixture 50 over the lens 20 with a typical focal length between the light center of the bulb and the incident surface of the lens. Means for holding the lens at this focal length consist of a typical metal hood 51 which is mounted at its apex to the socket fixture 50 by screws 52. The lens 20 is held to the lower margin of the hood 51 by typical screws 53 and a flanged member 54 which enters into a cooperating recess on the periphery of the lens. The greater the distance of the light center from the center of the plate the greater the angle of incidence of a light ray emitted from the theoretical light center. At the periphery of the plate the angle is about 59.5 degrees and therefore very close to the critical angle of 60 degrees. With a typical 12 inch square plate the maximum angles of incidence are at the corners and approximate 67 degrees, as is shown in FIGURE 8, which is beyond the critical angle.

In actual practice the light rays almost never come from a single point source although the source is relatively concentrated. Usually the light source is a frosted globular lamp (such as illustrated in FIG. 20) or fluorescent tube having dimensions of considerable proportions relative to the light transmitting plate. Hereinafter such sources will be referred to as "concentrated light source." Each area of the light transmitting plate receives some light from every part of the lamp surface to which it is exposed. The result is that the angles of incidences are larger for light rays transmitted from the bottom of the lamp (FIG. 9). In addition, light coming from the sides of the lamp (FIG. 10) and impinging upon a local area (FIG. 10*a*) which is sloping away from the light transmission point has an incident angle greater than light which is transmitted from points on the lamp in the radial plane of the local area.

These angles of incidence (except for FIG. 10*a*) are illustrative of plates having a flat incident surface; that is, with no surface irregularities and, therefore, with no diffusion means for diffusing or scattering the incident light to avoid glare.

All diffusion means utilize some surface irregularities.

FIGURE 11 shows the effect on the angles of incidence when an irregularity is added for purposes of obtaining diffusion.

If the irregularity is in the form of an elliptical projection having its longer axis radial from the center of the plate, a ray of light *r* incident on the side of the projection sloping toward the light source is incident at an angle *i*. See FIGURE 11. This is less than the angle *i''* for a flat surface. The angle is decreased by the angle of departure *d* of the irregularity from the flat incident surface. On the other hand, a ray *r'* incident on the side of the projection which slopes away from the light source has an incident angle *i'* which is greater than the angle *i''* which would have existed if no surface irregularity were present. The incident angle is increased by the angle of departure *d'* of the surface with respect to the flat incident surface.

For example, assuming that in both cases the angle of departure is 25 degrees and the angle of incidence *i''* with respect to the theoretical flat surface is 55 degrees. In the case of the light ray *r* which slopes toward the light source the angle of incidence *i* is 30 degrees, 55 degrees less 25 degrees. This reduces the percentage of light reflected from about 8% (see FIG. 6) to about 5% or conversely causes an increase in transmitted light of 3%. However, in the case of the light ray *r'* which is incident to the surface of the projection where it slopes away from the light source, the incident angle is increased to 80 degrees, 55 degrees plus 25 degrees. The percentage of light reflected as shown by FIGURE 6 is increased from about 8% to about 38% to produce a decrease of 30% in the amount of light transmitted.

This illustrates that any projection or irregularity in the incident surface of a light transmitting plate results in a net reduction in the total amount of light transmitted. Any disturbance of the incident surface of the light transmitting plate results in some loss of light by increased reflection; this loss becomes more acute in those areas remote from the optical axis hereinafter referred to as the outer peripheral portion of the plate. But the net reduction in light transmission is small in all instances where the actual total angle of incidence is kept below the critical angle of 60 degrees. For greater efficiency in light transmission, therefore, the angle of departure of the surface interruptions should be very small.

I have found that with conventional focal lengths and other typical conditions encountered in the practice, surface irregularities having a maximum angle of departure of 12 degrees or less minimize the number of actual total incident angles greater than the critical angle of 60 degrees, and in all instances the size of each such actual incident angle is substantially lessened. Such maximum angle provides a scattering or diffusion of light comparable to the diffusion means of the present practice but with an extremely low order of light loss. Beyond this maximum angle, light transmission efficiency rapidly drops off. A maximum angle of 8½ degrees also provides large diffusion with even greater efficiency of light transmission and is preferred. I have also found that a maximum angle of 5 degrees provides substantially less diffusion, though adequate by present standards, but with extreme low order of light loss.

I have also discovered that the maximum angle of departure which provides for maximum diffusion consistent with minimum light loss is substantially the same as the maximum angle of departure which provides for substantially uniform brightness.

FIGURES 12 to 15 illustrate the angles of deviation of typical lines of sight from a normal viewing position beneath the light transmitting plate. Briefly, if each of substantially all of these lines of sight intersect the light source, the viewer sees a plate of substantially uniform brightness. On the other hand, if a substantial number of lines of sight fail to intersect the source of illumination there will be contrasting light and dark areas which are disconcerting to the viewer. In order to explain the relation between the maximum angle of departure and this angle of deviation some basic theory of optical refraction will first be discussed.

Every optical medium has a refractive index which is related to the velocity of light in that medium. The refractive index for air is taken as unity and all others are customarily expressed as multiples thereof. When light passes from one medium to another having a different refractive index, the light path is bent unless the incident beam is perpendicular to the surface separating the two mediums.

The general law governing this action is as follows:

Let $A$=angle which the beam makes with the perpendicular to the separating surface while passing through the medium of lower index of refraction. For simplicity, let this medium be air having an index of 1.

Let $B$=angle which the beam makes with the perpendicular to the separating surface while passing through the medium of higher index of refraction.

Then $\frac{\sin A}{\sin B}$=Index of refraction for medium B.

The index of refraction for glass varies somewhat with its composition, but 1.5 is a commercial average. Therefore, whenever a beam of light passes into or out of an average piece of glass, the angle which its path in air makes with the perpendicular to the plane of separation, will be related to the angle which its path in glass makes with the perpendicular to the plane of separation, by the equation, $\sin A=1.5\times\sin B$.

The change in direction or deviation C will be the difference between A and B, $C=A-B$.

Lines of sight from a viewer beneath a light transmitting plate can be analyzed by assuming that each line of sight acts like a light ray. FIGURE 12 illustrates how a series of lines of sight pass through the light transmitting plate 20 having a diffusion section in the form of a flute with a sinusoidal cross section or profile. The lines of sight are assumed to be parallel since the viewer can be considered to be an infinite distance away, for the viewing distance is very large as compared to the dimensions which are the major factors in determining deviation. Therefore, all of the lines *a—c*, *d—b* and *g—i* are shown passing through the plate as parallel and substantially perpendicular to the theoretical plane of the plate. FIGURES 12 and 12A indicate that the lines of sight, after passing through crest or trough of the diffusing flutes, are dispersed over a rather wide angle. Anything which comes within this angle would be at least partially visible to a viewer standing anywhere along the lines *a—c*, *d—b* and *g—i*.

FIGURE 13 shows the same diffusion section as FIGURE 12 but includes a filament seven-eighths of an inch in length centered directly over the crest of the flute at a focal length of 3.5 inches from the theoretical plane of mean incident surface. In practice, larger lamps have larger filaments and longer focal lengths, and smaller lamps are placed closer to the plate with smaller filaments. The angle subtended by the filament from a point on the incident surface would be about 7.1 degrees either side of the center line. Any of the sight lines of FIGURE 13 which come within the subtended angle will lead directly to some portion of the filament and any of the lines outside of that angle will lead elsewhere. If each of substantially all of the lines of sight from a normal viewing position intersect the filament then the viewer will see a glass plate of substantially uniform brightness without contrasting light and dark areas.

Therefore, if the maximum angle of departure is chosen so that the lines of sight are not deviated outside of the angle subtended by the filament, uniform brightness will result.

Assuming the ideal case of a filament located directly over the flute, FIGURE 14 shows the maximum permissible angle of deviation under these conditions to be 13.7 degrees which is most easily determined from a refraction table but can be proved by the following:

As indicated above, the angle change of direction $C$=the angle in air, A, minus the angle in glass, B, which is also the angle of deviation. $C=A-B=7.1°$ and $B=13.7°$ then $A=B+C=20.8°$, sin 20.8=.35511, sin 13.7°=.23684, $$\frac{.35511}{.23684}=1.49936$$

or about 1.5.

Therefore, for purposes of obtaining substantially uniform brightness, the maximum angle of deviation of the profile of each of the flutes of the light diffusion system should be 13.7 degrees assuming the ideal case where the filament of the lamp is positioned exactly over the optical center with the projection of the filament on the incident surface of the glass transmitting plate exactly in line with the crests of the flutes. (It should be noted that the filament is generally circular in construction so that the crest of each radial flute could bisect the projection of the filament on the plate.)

However, this ideal positioning of the filament is rarely realized in commercial luminaire construction. In actual practice the filament is likely to be displaced from the optical center by at least one-eighth of an inch which is the condition illustrated in FIGURE 15. In this case the limiting line of sight which will touch the filament is 4.5 degrees from the optical axis and, therefore, the most practical maximum angle of deviation of the incident surface from the theoretical plane (insofar as uniform brightness is concerned) is 8.5 degrees.

In the preferred embodiment of the invention shown in FIGURE 5 the diffusion sections are chosen to have a profile having a maximum deviation angle of 8.5 degrees for the purpose of obtaining the extremely large amount of diffusion consistent with maximum amount of light transmission. Such a light transmitting plate designed in accordance with the invention will also provide substantially uniform brightness.

It has been found that the advantages accruing from the invention when the maximum angle of departure is 8.5 degrees are substantially obtained also with the embodiments of the invention shown in FIGURE 16. These are sinusoidal profiles with maximum angles of departure of about 5 degrees and about 12 degrees respectively. The same is true for semi-circular profiles and other profiles with a maximum deviation angle in the range of about 5 to about 12 degrees.

It is important to note that the range of maximum departure angles of 5 to 12 degrees is indicated as producing the best results in accordance with the accepted standards of performance of luminaires. However, variations in the angles of departure from this range may be made but only at a substantial reduction in performance.

Further, the invention is not limited to radial diffusion sections but may be employed with parallel diffusion sections as is illustrated in the embodiment of the invention shown in FIGURE 19, providing the maximum departure angle of the illustrated flutes is chosen to fall within the range of 5 to 12 degrees and is preferably 8.5 degrees. With the embodiment of FIGURE 19, the prisms (not shown) are positioned at right angles to the diffusion sections.

The diffusion sections can have any desired relationship to each other, to the outlines of the light transmitting plate, or to the prisms. They may be diagonal or spiral configurations, or other configuration forms. The maximum diffusion effect with minimum disturbance of light distribution pattern is attained when the diffusion sections are approximately perpendicular to the prisms. The worse effects are obtained when they are parallel thereto.

In order to show the new and differing results achieved by light transmitting plates prepared in accordance with the principles of the invention, comparisons in performance have been made with diffusion systems having differing angles of departure but which were otherwise similar. The performance was measured in terms of apparent candle power distribution of the same luminaire.

FIGURE 17 shows the candle power distribution for three (3) lenses having the same identical size, and prisms on the exit face but different incident surfaces. In each case, the same lamp was used at the same focal length and voltage.

Curve A is for a lens having an unbroken flat plane for its upper surface. Curve B is for a lens having a sinusoidal radial wave pattern, having a maximum angle of departure from the mean incident surface of 24°. Curve C is for a lens of the most preferred type having a sinusoidal radial wave pattern on the incident surface with a maximum angle of departure from the mean incident surface of 8½° in accordance with the invention. The amounts by which curves B and C depart from curve A indicate the loss of light and alterations to the light distribution caused by reflection losses resulting from the diffusion systems. Note that, curve C of the invention has high and uniform light transmission of about 840 candle power through the 60 degree range under the lens, whereas curve B rapidly drops off within a 20 degree range.

Candle power distribution curves do not depict the quantity of light flux. To present this information, FIGURE 18 has been prepared showing the lumen valves for these same curves, the conversion having been made in accordance with the standard zonal index method as will be understood by those skilled in the art.

The total light flux received by the incident surface of these lenses from the lamp was 1315 lumens. The total output from lens A is 1247 lumens. The total output from lens B is only 1146 lumens. The total output from lens C is 1230 lumens. Thus, the lens C recaptures about five-sixths of the lumens lost by the lens of curve B versus the ideal surface of lens A.

It should be noted that the lumen output curve for lenses A and C coincide almost exactly in the angular zone from 0 to 10 degrees and in the zone from 38 degrees to 90 degrees. However, the lumen distribution curve for lens B, while corresponding with the others at the lower angles, crosses the others at angle 38 and from thereon is outside of them. This represents the degree of distortion and glare caused by a diffuser of large angle. The energy represented by this portion of the curve for lens B is at an angle where illumination is not desired although it has been included in the total output in determining the results of the invention given above.

Referring to the square prismatic lens shown in FIGURE 19, the following dimensions are given by way of example in order to illustrate this specific application of the principles of the invention:

| | |
|---|---|
| Length of each side ---------- inches -- | 12 |
| Number of flutes ---------- | 60 |
| Linear separation between the crests of flutes ----- | .200 |
| Amplitude of flutes ---------- inches -- | .0095 |
| Maximum departure angle of flutes ----- degrees -- | 8.5 |
| Number of prisms ---------- | 36 |
| Refractive index ---------- | 1.50 |
| Focal length from filament to mean incident surface ---------- inches -- | 3.5 |

Therefore, in accordance with the invention an improved diffusion system for light transmitting plates has been described which provides the required diffusion to avoid excessive glare and prevents the outlines of the light source from being discernible by the viewer, all without a substantial reduction in light transmission. This is accomplished so that the viewer sees a light transmitting plate which is of substantially uniform brightness, without hot spots or areas of contrasting brightness, and which presents a soothing and pleasing sensation.

Although the invention has been disclosed in connection with a number of embodiments it will be apparent that many modifications and changes may be readily made without departing from the spirit and scope of the invention.

What is claimed is:

1. A lighting device comprising a flat plate having Fresnel prisms on the light exit side and having diffusing sections covering the light incident side, a concentrated light source positioned on said light incident side within the periphery of the plate and at the focal point of the plate, means for holding said light source in such position, the diffusing sections being disposed to cross the prisms at right angles, and said diffusing sections having a non-planar surface with a maximum angle of departure with respect to the theoretical surface of the light incident side of said flat plate in the range of 5° to 12°.

2. The subject matter of claim 1 characterized by the fact that the diffusing sections are radial flutes extending from the center of the flat plate and having a sinusoidal cross-section.

3. The subject matter of claim 2 characterized by the fact that the non-planar surfaces of the diffusing sections have a maximum angle of departure of 8.5° with respect to the theoretical surface of the light incident side of said flat plate.

References Cited in the file of this patent

UNITED STATES PATENTS

| | | |
|---|---|---|
| 1,370,885 | Frederick et al. | Mar. 8, 1921 |
| 1,746,852 | Champeau | Feb. 11, 1930 |
| 2,022,078 | Dorey | Nov. 26, 1935 |
| 2,099,034 | Rolph | Nov. 16, 1937 |
| 2,124,417 | Hamel et al. | July 19, 1938 |
| 2,551,954 | Lehman | May 8, 1951 |
| 2,758,200 | France | Aug. 7, 1956 |
| 2,853,599 | Kliegl | Sept. 23, 1958 |
| 2,877,342 | Beach | Mar. 10, 1959 |